United States Patent
Li

(10) Patent No.: US 6,616,304 B2
(45) Date of Patent: *Sep. 9, 2003

(54) TEMPERATURE CONTROL FOR ARC LAMPS

(75) Inventor: Kenneth K. Li, Arcadia, CA (US)

(73) Assignee: Cogent Light Technologies, Inc., Santa Clarita, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/969,031

(22) Filed: Oct. 3, 2001

(65) Prior Publication Data

US 2002/0064056 A1 May 30, 2002

Related U.S. Application Data

(60) Provisional application No. 60/237,392, filed on Oct. 4, 2000.

(51) Int. Cl.[7] .............................................. F21V 7/06
(52) U.S. Cl. .................. 362/302; 362/298; 362/293
(58) Field of Search ................................ 362/297, 298, 362/302, 346, 304, 345, 262, 264, 265; 315/117, 116, 118; 313/13, 12

(56) References Cited

U.S. PATENT DOCUMENTS

| | | | |
|---|---|---|---|
| 4,757,431 A | 7/1988 | Cross et al. | |
| 4,978,890 A | 12/1990 | Sekiguchi et al. | 315/117 |
| 5,207,505 A | 5/1993 | Naraki et al. | 362/373 |
| 5,414,600 A | 5/1995 | Strobl et al. | |
| 5,430,634 A | 7/1995 | Baker et al. | |
| 5,612,593 A | 3/1997 | Olson | 315/117 |
| 6,227,682 B1 * | 5/2001 | Li | 362/302 |
| 6,231,199 B1 * | 5/2001 | Li | 359/857 |

FOREIGN PATENT DOCUMENTS

| | | |
|---|---|---|
| DE | 3923108 A1 | 2/1990 |
| FR | 1594592 | 7/1970 |
| WO | WO 9815970 A1 | 4/1998 |

* cited by examiner

Primary Examiner—Sandra O'Shea
Assistant Examiner—Hargobind S. Sawhney
(74) Attorney, Agent, or Firm—Rothwell, Figg, Ernest & Manbeck, pc

(57) ABSTRACT

A temperature control system for a source of electromagnetic radiation, such as an arc lamp, in a collecting and condensing system including a first reflector having a first focal point and a first optical axis, and a second reflector having a second focal point and a second optical axis. The source may be located proximate to the first focal point of the first reflector to produce rays of radiation that reflect from the first reflector toward the second reflector and substantially converge at the second focal point. A sensor, such as a voltage or a temperature sensor, may be placed near the source, and produces an output which may be substantially proportional to an attribute of the source. A comparator compares the output to a predetermined value and produces a difference between the output and the predetermined value. A fan placed proximate to the source has an air flow to cool the source which may be substantially proportional to the difference between the output and the predetermined value if the output is greater than the predetermined value. Otherwise, if the output is less than the predetermined value, the air flow may be substantially zero. The temperature control system may also include a heater placed near the source which produces a heat flux. In this case the comparator compares the output to a second predetermined value, producing a second difference between the output and the second predetermined value, and the heat flux may be substantially proportional to the second difference if the output is less than the second predetermined value. Otherwise, if the output is greater than the second predetermined value the heat flux may be substantially zero.

52 Claims, 3 Drawing Sheets

TEMPERATURE CONTROL FOR ARC LAMPS

CROSS-REFERENCE TO RELATED APPLICATIONS

This application claims priority to Provisional Application Serial No. 60/237,392, filed Oct. 4, 2000, the disclosure of which is incorporated by reference.

BACKGROUND OF THE INVENTION

1. Field of the Invention

This invention relates to temperature control of sources of electromagnetic radiation in illumination and projection systems.

2. Description of the Related Art

The objective of systems that collect, condense, and couple electromagnetic radiation into a target such as a standard waveguide, e.g. a single fiber or fiber bundle, or output electromagnetic radiation to the homogenizer of a projector, is to maximize the brightness of the electromagnetic radiation at the target. There are several common systems for collecting and condensing light from a lamp for such illumination and projection applications.

U.S. Pat. No. 4,757,431 ("the '431 patent"), the disclosure of which is incorporated by reference, describes a light condensing and collecting system employing an off-axis spherical concave reflector to enhance the flux illuminating a small target and the amount of collectable flux density reaching the small target. Another light condensing and collecting system is provided by U.S. Pat. No. 5,414,600 ("the '600 patent"), the disclosure of which is incorporated by reference, describes the use of an ellipsoid concave reflector. Similarly, U.S. Pat. No. 5,430,634 ("the '634 patent"), the disclosure of which is incorporated by reference, describes the use of a toroid concave reflector.

U.S. patent application Ser. No. 09/604,921, the disclosure of which is incorporated by reference, provides a dual-paraboloid reflector system. This optical collection and condensing system, as illustrated in FIG. 1, uses two generally symmetric paraboloid reflectors 10, 11 that are positioned so that light reflected from the first reflector 10 is received in a corresponding section of the second reflector 11. In particular, light emitted from a light source 12, such as an arc lamp, is collected by the first parabolic reflector 10 and collimated along the optical axis toward the second reflector 11. The second reflector 11 receives the collimated beam of light and focuses this light at the target 13 positioned at the focal point.

The optical system of FIG. 1 may employ a retro-reflector 14 in conjunction with the first paraboloid reflector 10 to capture radiation emitted by the light source 12 in a direction away from the first paraboloid reflector 10 and reflect the captured radiation back through the light source 12. In particular, the retro-reflector 14 has a generally spherical shape with a focus located substantially near the light source 12 (i.e., at the focal point of the first paraboloid reflector) toward the first paraboloid reflector to thereby increase the intensity of the collimated rays reflected therefrom.

U.S. application Ser. No. 09/669,841, the disclosure of which is incorporated by reference, describes a dual ellipsoidal reflector system. This optical collection and condensing system, as illustrated in FIG. 2, uses two generally symmetric ellipsoid reflectors 20, 21 that are positioned so that light reflected from the first reflector 20 is received in a corresponding section of the second reflector 21. In particular, light emitted from the light source 22 is collected by the first elliptical reflector 20 and focused at the optical axis 25 toward the second reflector 21. The second reflector 21 receives the diverged beam of light and focuses this light at the target 23 positioned at the focal point.

The systems described above are required to be efficient and have relatively long useful lives. Arc lamps, e.g. metal halide lamps, are often used in the above-mentioned systems as sources of light. Such arc lamps often have quartz envelopes. Quartz tends to react with metal halides at temperatures above about 1100° C. Thus, if the lamp temperature is allowed to exceed 1100° C., the metal halide will react with the quartz. Such a reaction changes the chemical composition of the metal halide within the quartz envelope, reducing the efficiency of the metal halide as a light source. Furthermore, products of the reaction will be deposited on the quartz envelope, blocking some of the light.

On the other hand, if the temperature is allowed to get too low, cold spots will occur around the arc. Proper evaporation of the metal halide does not take place if the temperature is too low, as within such cold spots. This will also reduce the efficiency of the discharge. There thus exists a narrow range of temperatures within which a metal halide lamp operates most efficiently, commensurate with long life.

While the above embodiments describe the application of the temperature control system to a dual-paraboloid illumination system, the same can be applied to a conventional on-axis system to prolong the life of the lamp. The temperature control system could also be applied to, e.g. an on-axis ellipsoid reflector system, an on-axis parabolic reflector system, an off-axis concave reflector system. In those systems, the temperature control system will also control the heating/cooling systems such that the temperature of the lamp is maintained within the manufacturer's specifications.

Therefore, there remains a need to provide a method of controlling the temperature of a metal halide lamp in a collecting and condensing system within a narrow range of temperatures.

SUMMARY

A temperature control system for a source of electromagnetic radiation, such as an arc lamp, in a collecting and condensing system including a first reflector having a first focal point and a first optical axis and a second reflector having a second focal point and a second optical axis. The first and second reflectors may be placed substantially symmetrically to each other such that their optical axes are substantially collinear. The source may be located proximate to the first focal point of the first reflector to produce rays of radiation that reflect from the first reflector towards the second reflector and substantially converge at the second focal point. A sensor, such as a voltage or a temperature sensor, may be disposed proximate to the source, and produces an output which may be substantially proportional to an attribute of the source. A comparator compares the output to a predetermined value and produces a difference between the output and the predetermined value. A cooling device such as a fan placed proximate to the source has a cooling transmission such as an air flow to cool the source. The cooling transmission such as the air flow may be substantially proportional to the difference between the output and the predetermined value if the output is greater than the predetermined value. In the alternative, the cooling transmission such as the air flow may be substantially constant if the output is greater than the predetermined value. In either case, if the output is less than the predetermined value, the cooling transmission such as the air flow may be substantially zero.

The temperature control system may also include a heater placed proximate to the source which produces a heat flux. In this case the comparator compares the output to a second predetermined value, and produces a second difference between the output and the second predetermined value. The heat flux may be substantially constant or, in an alternative embodiment, may be substantially proportional to the second difference if the output is less than the second predetermined value. Otherwise, if the output is greater than the second predetermined value the heat flux may be substantially zero.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
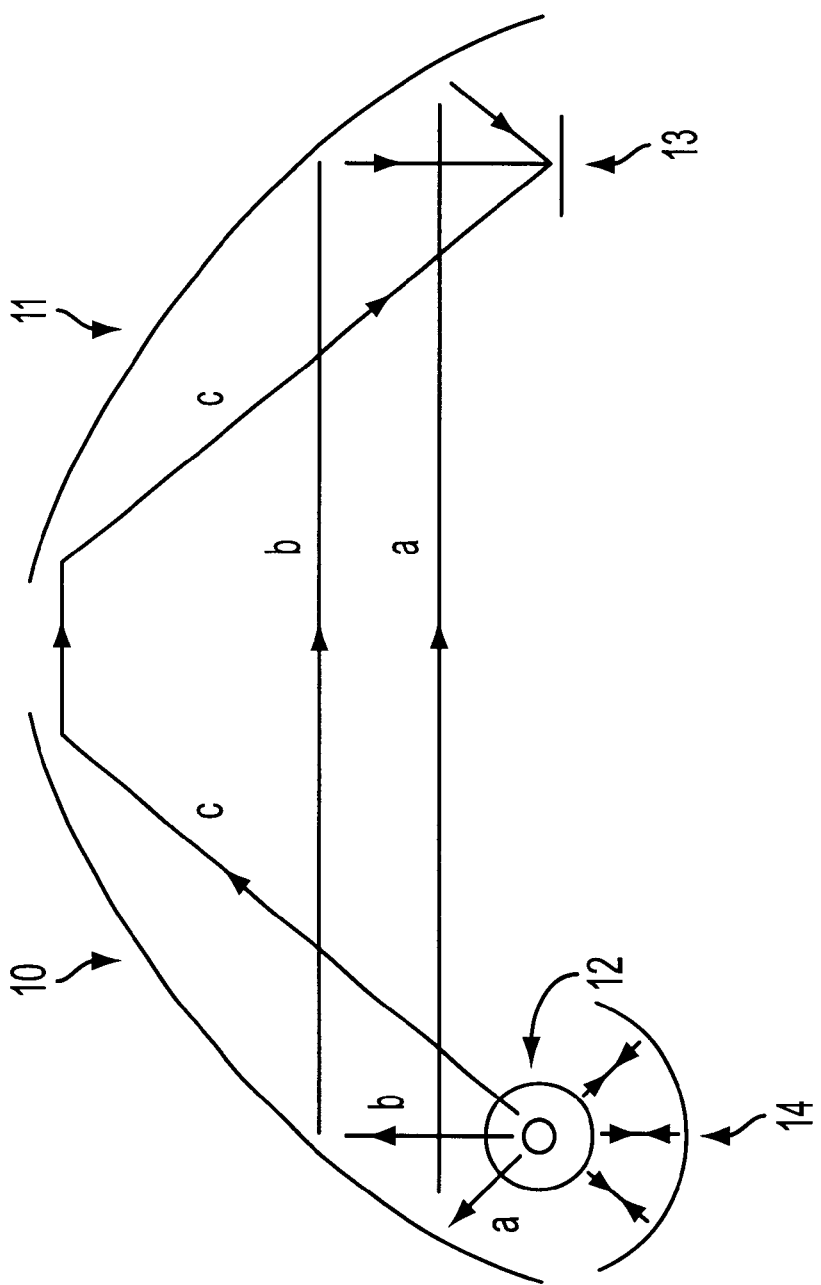
FIG. 1 is a schematic diagram of a collecting and condensing system for use with an embodiment of the invention.
Figure 2:
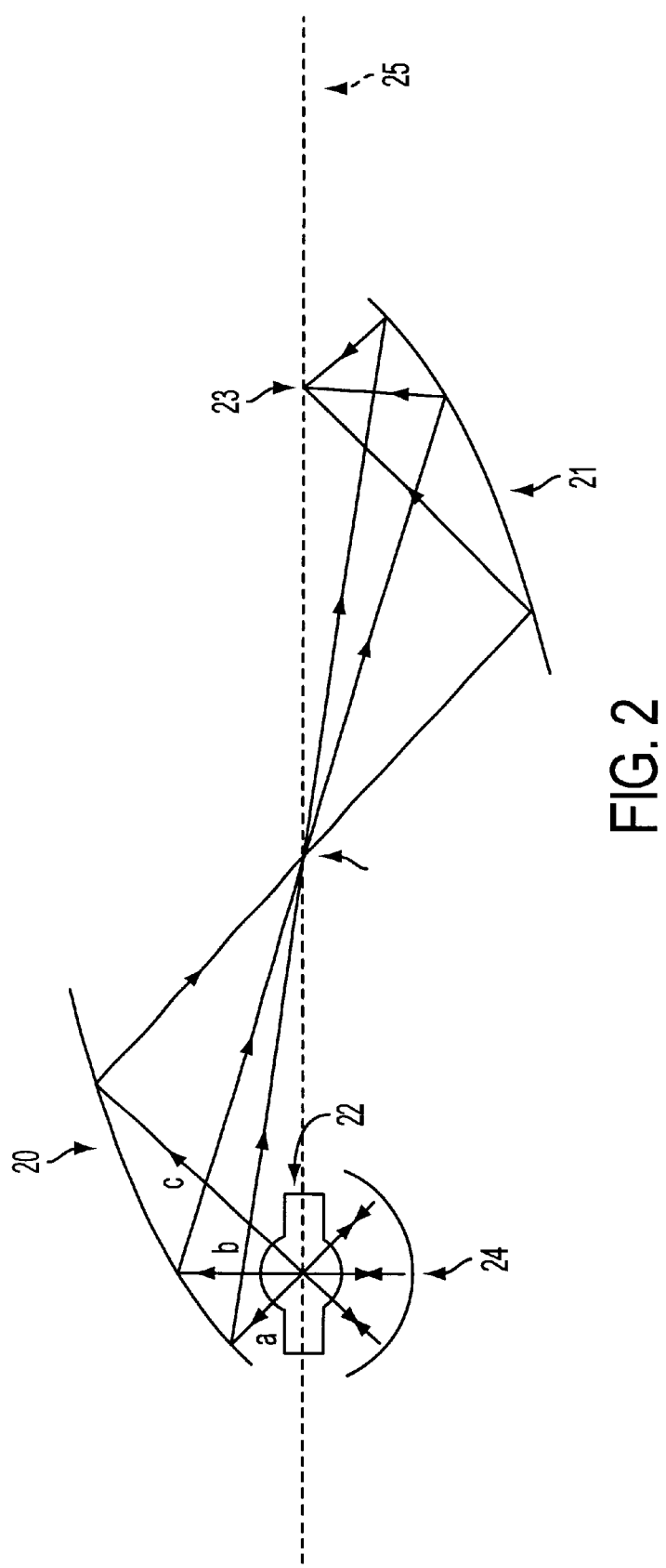
FIG. 2 is a schematic diagram of a collecting and condensing system for use with an embodiment of the invention.
Figure 3:
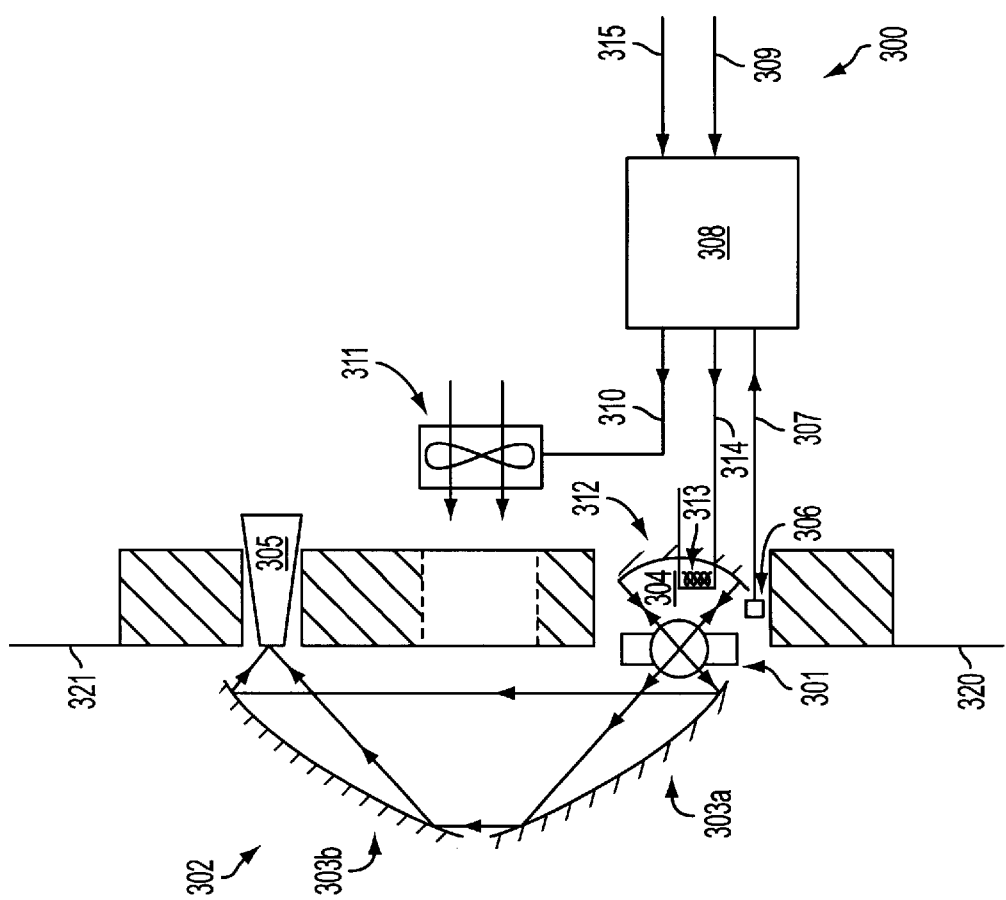
FIG. 3 is a schematic diagram of a feedback control system for controlling the temperature of a metal-halide lamp in a collecting and condensing system according to an embodiment of the invention.

In FIG. 3 is shown a temperature control system 300 for maintaining the temperature of a source of electromagnetic radiation 301 in a collecting and condensing system 302. The collecting and condensing system 302 includes a first reflector 303a having a first focal point 304 and a first optical axis 320, and a second reflector 303b having a second focal point 305 and a second optical axis 321. In one embodiment, first and second reflectors 303 are placed substantially symmetrically to one another such that first optical axis 320 is substantially collinear with second optical axis 321. The first and second reflectors 303 are shown as a pair of parabolic reflectors 303a and 303b facing one another in FIG. 3, but the first and second reflectors 303 may also be, e.g., a single ellipsoidal reflector 303 as well.

Source 301 is located proximate to the first focal point 304 of the first reflector 303a to produce rays of radiation that reflect from the first reflector 303a toward second reflector 303b and substantially converge at second focal point 305. In one embodiment, source 301 is an arc lamp. In another embodiment, source 301 is a filament lamp. In a preferred embodiment, source 301 is a metal halide arc lamp, although source 301 may also be a xenon lamp, an HID lamp, a mercury lamp, or a high pressure mercury lamp. A sensor 306 placed near source 301 produces an output 307 which may be substantially proportional to an attribute of source 301, such as the temperature at source 301 or the voltage drop across source 301. The attribute of source 301 may also be a current drawn by source 301, a resistance across source 301, an inductance across source 301, or a radiance near source 301. In one embodiment, sensor 306 is a transducer, but sensor 306 may also reflect an attribute of source 301 directly, such as if, e.g. output 307 is a voltage drop across source 301. Output 307 may be scaled appropriately as would be known to persons skilled in the art.

A comparator 308 compares output 307 to a predetermined value 309 and produces a difference 310 between the output 307 and the predetermined value 309. If, e.g. the attribute represented by output 307 is a temperature, then the predetermined value 309 will be a signal similar to output 309 representing a predetermined temperature. The predetermined value relates to the operating temperature of the lamp. If, as in the preferred embodiment, source 301 is a metal halide arc lamp, then the predetermined value is about 1100° C.

A cooling device such as a fan 311 is placed near source 301 to cool source 301 with a cooling transmission such as an air flow. Fan 311 may be, e.g. a box fan or a centrifugal fan. The air flow of fan 311 may be, e.g., proportional to a rotational velocity of a shaft of fan 311.

In one embodiment, the air flow of fan 311 is constant if the output 307 is greater than the predetermined value 309, i.e., if the temperature of source 301 is higher than predetermined value 309, or difference 310 is positive. That is, fan 311 provides air to cool source 301 while the temperature of source 301 is higher than predetermined value 309. Once the temperature of source 301 drops below predetermined value 309, however, fan 311 may be turned off. In a preferred embodiment, the air flow of fan 311 may be substantially proportional to difference 310 if the output 307 is greater than the predetermined value 309, i.e., if the temperature of source 301 is higher than predetermined value 309. In this embodiment, the air flow of fan 311 is variable such that a certain temperature is maintained at a certain air flow. In either embodiment, if output 307 is less than the predetermined value 309, the air flow may be substantially zero.

In an alternate embodiment, an additional reflector 312 may be placed to reflect at least part of that portion of the electromagnetic radiation from source 301 that does not impinge directly on reflector 303 back toward reflector 303 through the first focal point 304 of reflector 303 to increase the flux intensity of the converging rays. In a preferred embodiment, additional reflector 312 is a spherical retroreflector.

In one embodiment, sensor 306 may be inside additional reflector 312. In a preferred embodiment, sensor 306 may be integral with additional reflector 312.

In an alternate embodiment, a heater 313 producing a heat flux may be placed near source 301 to heat source 301. Heater 313 may be, e.g. a resistance coil, an induction heater, a fluid circuit, or a damper. The fluid circuit could transfer heat from a heat source at a distance from the collecting and condensing system. Such a heat source may be, e.g. a centralized heat source for an array of several collecting and condensing systems. A damper would operate by blocking air circulating around the source 301 when the temperature was too low. Thus heat from source 301 itself would be used to raise its own temperature.

In a preferred embodiment, heater 313 may be disposed between the fan 311 and source 301. In one embodiment, the heat flux from heater 313 is a constant if the output 307 is less than a second predetermined value 315, i.e., if the temperature of source 301 is lower than second predetermined value 315. In a preferred embodiment, the heat flux from heater 313 may be substantially proportional to second difference 314 if the output 307 is less than a second predetermined value 315, i.e., if the temperature of source 301 is lower than second predetermined value 315. In either case, the heat flux may be substantially zero if the output 307 is greater than the second predetermined value 315, e.g., if the temperature of source 301 is higher than second predetermined value 315. That is, heater 313 provides heat to source 301 while the temperature of source 301 is lower than second predetermined value 315. Once the temperature of source 301 rises above second predetermined value 315, however, heater 313 may be turned off.

In one embodiment, predetermined value 309 may be substantially equal to second predetermined value 313. In a preferred embodiment, predetermined value 309 may be greater than second predetermined value 315, so comparator 308 doesn't 'hunt'.

A method for controlling the temperature of a source of electromagnetic radiation in a collecting and condensing system according to an embodiment of the invention is as follows. A source of electromagnetic radiation may be positioned at a first focal point of a reflector. Rays of radiation are produced by the source. The rays of radiation are reflected by the reflector. The rays of radiation are converged at a second focal point of the reflector. An attribute of the source may be sensed. An output substantially proportional to the attribute may be produced. The output may be compared to a predetermined value. The output may be checked to see if it is greater than the predetermined value. If it is, then an air flow may be provided to the source that may be substantially proportional to a difference between the output and the predetermined value.

In an alternate embodiment of the method described above, the output may be compared to a second predetermined value. The output may be checked to see if it is less than the second predetermined value. If it is, then a heat flux may be provided to the source substantially proportional to a second difference between the output and the second predetermined value.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A temperature control system for a source of electromagnetic radiation in a collecting and condensing system comprising:
    a source of electromagnetic radiation;
    a first reflector having a first focal point and a first optical axis;
    a second reflector having a second focal point and a second optical axis placed substantially symmetrically to said first reflector such that said first and second optical axes are substantially collinear;
    said source being located proximate to said first focal point of said first reflector to produce rays of radiation that reflect from said first reflector toward said second reflector and substantially converge at said second focal point;
    a sensor disposed proximate to said source, said sensor producing an output, said output being substantially proportional to an attribute of said source;
    a comparator, said comparator comparing said output to a predetermined value;
    a cooling device proximate to said source, said cooling device having a cooling transmission; and
    wherein said cooling transmission is directed at said source if said output is greater than said predetermined value.

2. The temperature control system for a source of electromagnetic radiation in a collecting and condensing system of claim 1, wherein:
    said comparator produces a difference between said output and said predetermined value; and
    wherein said cooling transmission is substantially proportional to said difference if said output is greater than said predetermined value.

3. The temperature control system for a source of electromagnetic radiation in a collecting and condensing system of claim 1, wherein said cooling device is a fan, and said cooling transmission is an air flow.

4. The temperature control system for a source of electromagnetic radiation in a collecting and condensing system of claim 3, wherein said fan is selected from the group consisting of:
    a box fan,
    a centrifugal fan.

5. The temperature control system for a source of electromagnetic radiation in a collecting and condensing system of claim 1, wherein said air flow is substantially zero if said output is less than said predetermined value.

6. The temperature control system for a source of electromagnetic radiation in a collecting and condensing system of claim 1, wherein said attribute is a temperature.

7. The collecting and condensing system of claim 1, wherein said first and second reflectors comprise at least a portion of a substantially ellipsoidal surface of revolution.

8. The collecting and condensing system of claim 1, wherein said first and second reflectors comprise at least a portion of a substantially toroidal surface of revolution.

9. The collecting and condensing system of claim 1, wherein said first and second reflectors comprise at least a portion of a substantially spheroidal surface of revolution.

10. The collecting and condensing system of claim 1, wherein said first and second reflectors comprise at least a portion of a substantially paraboloidal surface of revolution.

11. The collecting and condensing system of claim 1, wherein said source comprises an arc lamp.

12. The temperature control system for a source of electromagnetic radiation in a collecting and condensing system of claim 11, wherein said arc lamp is selected from the group consisting of:
    a xenon lamp,
    an HID lamp,
    a mercury lamp
    a metal halide lamp,
    a high pressure mercury lamp.

13. The temperature control system for a source of electromagnetic radiation in a collecting and condensing system of claim 1, wherein said source comprises a filament lamp.

14. The temperature control system for a source of electromagnetic radiation in a collecting and condensing system of claim 1, wherein:
    a portion of the electromagnetic radiation emitted by said source of electromagnetic radiation impinges directly on said first reflector and a portion of the electromagnetic radiation does not impinge directly on said first reflector; and
    wherein said system further comprises an additional reflector constructed and arranged to reflect at least part of the portion of the electromagnetic radiation that does not impinge directly on said first reflector toward said first reflector through the first focal point of said first reflector to increase the flux intensity of the converging rays.

15. The temperature control system for a source of electromagnetic radiation in a collecting and condensing system of claim 14, wherein said additional reflector comprises a spherical retro-reflector disposed on a side of said source opposite said first reflector to reflect electromagnetic radiation emitted from said source in a direction away from said first reflector toward said first reflector through the first focal point of said first reflector.

16. The temperature control system for a source of electromagnetic radiation in a collecting and condensing system of claim 14, wherein said sensor is integral with said additional reflector.

17. The temperature control system for a source of electromagnetic radiation in a collecting and condensing system of claim 1, wherein said attribute is selected from the group consisting of:

a current draw, a voltage drop, a resistance, an inductance, a radiance.

18. The temperature control system for a source of electromagnetic radiation in a collecting and condensing system of claim 1, further comprising:

a heater, said heater being proximate to said source;

said comparator comparing said output to a second predetermined value;

wherein said heater produces a heat flux if said output is less than said second predetermined value.

19. The temperature control system for a source of electromagnetic radiation in a collecting and condensing system of claim 18, wherein:

said comparator produces a second difference between said output and said second predetermined value; and said heat flux is substantially proportional to said second difference if said output is less than said second predetermined value.

20. The temperature control system for a source of electromagnetic radiation in a collecting and condensing system of claim 18, wherein said heat flux is substantially constant if said output is less than said second predetermined value.

21. The temperature control system for a source of electromagnetic radiation in a collecting and condensing system of claim 18, wherein said heat flux is substantially zero if said output is greater than said second predetermined value.

22. The temperature control system for a source of electromagnetic radiation in a collecting and condensing system of claim 18, wherein said predetermined value is substantially equal to said second predetermined value.

23. The temperature control system for a source of electromagnetic radiation in a collecting and condensing system of claim 18, wherein said predetermined value is greater than said second predetermined value.

24. The temperature control system for a source of electromagnetic radiation in a collecting and condensing system of claim 18, wherein said heater is disposed between said fan and said source.

25. The temperature control system for a source of electromagnetic radiation in a collecting and condensing system of claim 18, wherein said heater is selected from the group consisting of:

a resistance coil, an induction heater, a fluid circuit, a damper.

26. A method for temperature control of a source of electromagnetic radiation in a collecting and condensing system utilizing a temperature control system as defined in claim 1, the method comprising the steps of:

positioning the source of electromagnetic radiation at a first focal point of a first reflector;

producing rays of radiation by said source;

reflecting said rays of radiation by said first reflector;

converging said rays of radiation at a second focal point of a second reflector;

sensing an attribute of said source;

producing an output substantially proportional to said attribute;

comparing said output to a predetermined value;

providing a cooling transmission to said source substantially proportional to a difference between said output and said predetermined value if said output is greater than said predetermined value.

27. The method for temperature control of claim 26, wherein said cooling transmission is an air flow.

28. The method for temperature control of claim 26, the method further comprising the steps of:

comparing said output to a second predetermined value;

providing a heat flux to said source substantially proportional to a second difference between said output and said second predetermined value if said output is less than said second predetermined value.

29. A temperature control system for a source of electromagnetic radiation in a collecting and condensing system comprising:

a source of electromagnetic radiation;

a reflector having a focal point;

said source being located proximate to said focal point of said reflector to produce rays of radiation that are substantially reflected by said reflector;

a sensor disposed proximate to said source, said sensor producing an output, said output being substantially proportional to an attribute of said source;

a comparator, said comparator comparing said output to a predetermined value;

a cooling device proximate to said source, said cooling device having a cooling transmission; and wherein said cooling transmission is directed at said source if said output is greater than said predetermined value.

30. The temperature control system for a source of electromagnetic radiation in a collecting and condensing system of claim 29, wherein:

said comparator produces a difference between said output and said predetermined value; and wherein said cooling transmission is substantially proportional to said difference if said output is greater than said predetermined value.

31. The temperature control system for a source of electromagnetic radiation in a collecting and condensing system of claim 29, wherein:

said cooling transmission is substantially constant if said output is greater than said predetermined value.

32. The temperature control system for a source of electromagnetic radiation in a collecting and condensing system of claim 29, wherein said cooling device is a fan, and said cooling transmission is an air flow.

33. The temperature control system for a source of electromagnetic radiation in a collecting and condensing system of claim 32, wherein said fan is selected from the group consisting of:

a box fan, a centrifugal fan.

34. The temperature control system for a source of electromagnetic radiation in a collecting and condensing system of claim 29, wherein said air flow is substantially zero if said output is less than said predetermined value.

35. The temperature control system for a source of electromagnetic radiation in a collecting and condensing system of claim 29, wherein said attribute is a temperature.

36. The collecting and condensing system of claim 29, wherein said reflector comprises at least a portion of a substantially ellipsoidal surface of revolution.

37. The collecting and condensing system of claim 29, wherein said reflector comprises at least a portion of a substantially toroidal surface of revolution.

38. The collecting and condensing system of claim 29, wherein said reflector comprises at least a portion of a substantially spheroidal surface of revolution.

39. The collecting and condensing system of claim 29, wherein said reflector comprises at least a portion of a substantially paraboloidal surface of revolution.

40. The temperature control system for a source of electromagnetic radiation in a collecting and condensing system of claim 29, wherein said attribute is selected from the group consisting of:

a current draw, a voltage drop, a resistance, an inductance, a radiance.

41. The collecting and condensing system of claim 29, wherein said source comprises an arc lamp.

42. The temperature control system for a source of electromagnetic radiation in a collecting and condensing system of claim 41, wherein said arc lamp is selected from the group consisting of:

a xenon lamp, an HID lamp, a mercury lamp a metal halide lamp, a high pressure mercury lamp.

43. The temperature control system for a source of electromagnetic radiation in a collecting and condensing system of claim 29, wherein said source comprises a filament lamp.

44. The temperature control system for a source of electromagnetic radiation in a collecting and condensing system of claim 29, wherein:

a portion of the electromagnetic radiation emitted by said source of electromagnetic radiation impinges directly on said reflector and a portion of the electromagnetic radiation does not impinge directly on said reflector; and wherein said system further comprises an additional reflector constructed and arranged to reflect at least part of the portion of the electromagnetic radiation that does not impinge directly on said reflector toward said reflector through the first focal point of said reflector to increase the flux intensity of the converging rays.

45. The temperature control system for a source of electromagnetic radiation in a collecting and condensing system of claim 44, wherein said additional reflector comprises a spherical retro-reflector disposed on a side of said source opposite said reflector to reflect electromagnetic radiation emitted from said source in a direction away from said reflector toward said reflector through the first focal point of said reflector.

46. The temperature control system for a source of electromagnetic radiation in a collecting and condensing system of claim 44, wherein said sensor is integral with said additional reflector.

47. The temperature control system for a source of electromagnetic radiation in a collecting and condensing system of claim 29, further comprising:

a heater, said heater being proximate to said source;

said heater having a heat flux;

said comparator comparing said output to a second predetermined value, said comparator producing a second difference between said output and said second predetermined value;

wherein said heat flux is substantially proportional to said second difference if said output is less than said second predetermined value.

48. The temperature control system for a source of electromagnetic radiation in a collecting and condensing system of claim 47, wherein said heat flux is substantially zero if said output is greater than said second predetermined value.

49. The temperature control system for a source of electromagnetic radiation in a collecting and condensing system of claim 47, wherein said predetermined value is substantially equal to said second predetermined value.

50. The temperature control system for a source of electromagnetic radiation in a collecting and condensing system of claim 47, wherein said predetermined value is greater than said second predetermined value.

51. The temperature control system for a source of electromagnetic radiation in a collecting and condensing system of claim 47, wherein said heater is disposed between said fan and said source.

52. The temperature control system for a source of electromagnetic radiation in a collecting and condensing system of claim 47, wherein said heater is selected from the group consisting of:

a resistance coil, an induction heater, a fluid circuit, a damper.

* * * * *